June 30, 1970  B. L. LONNGREN ET AL  3,517,975
ROLLER BEARING CONSTRUCTION
Filed May 10, 1968  4 Sheets-Sheet 1
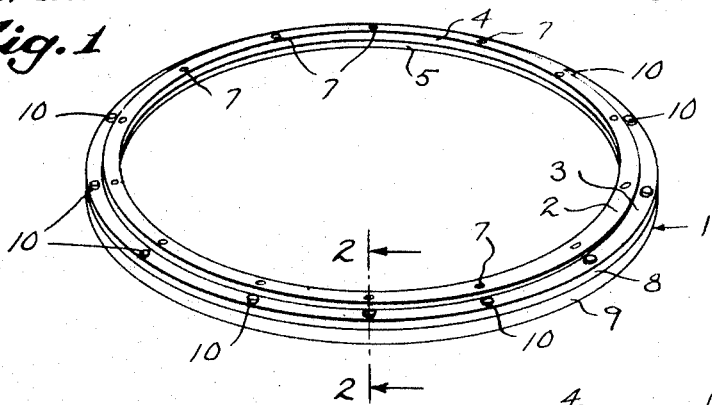
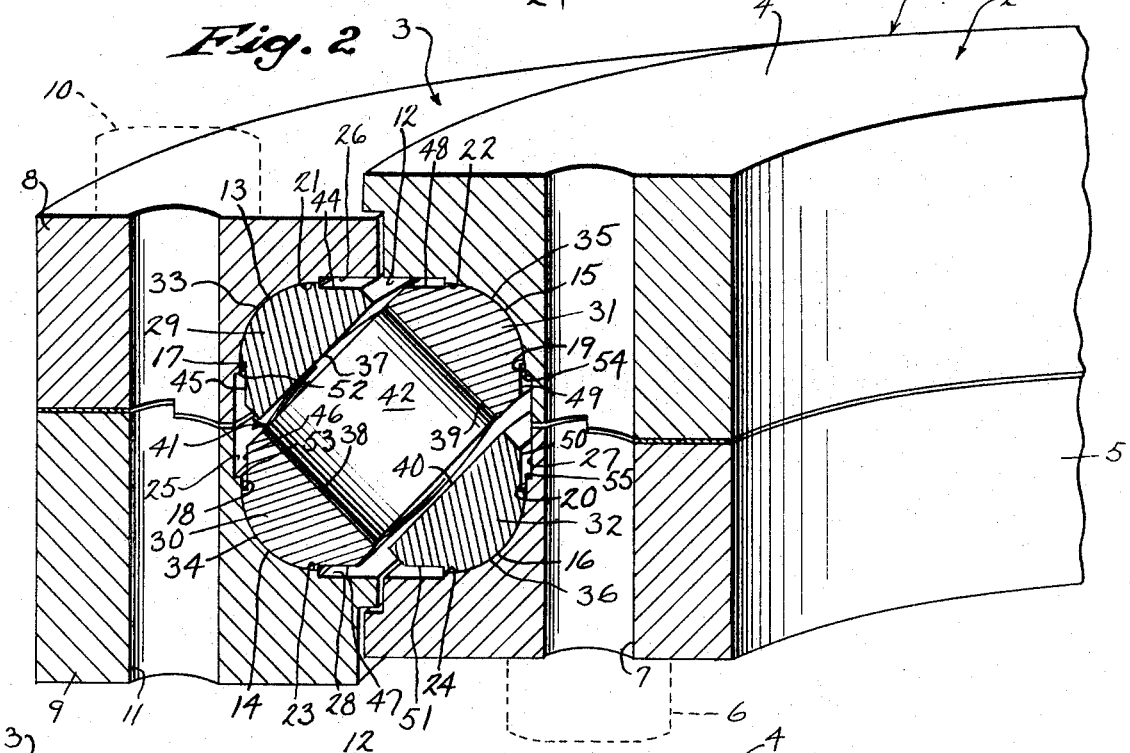
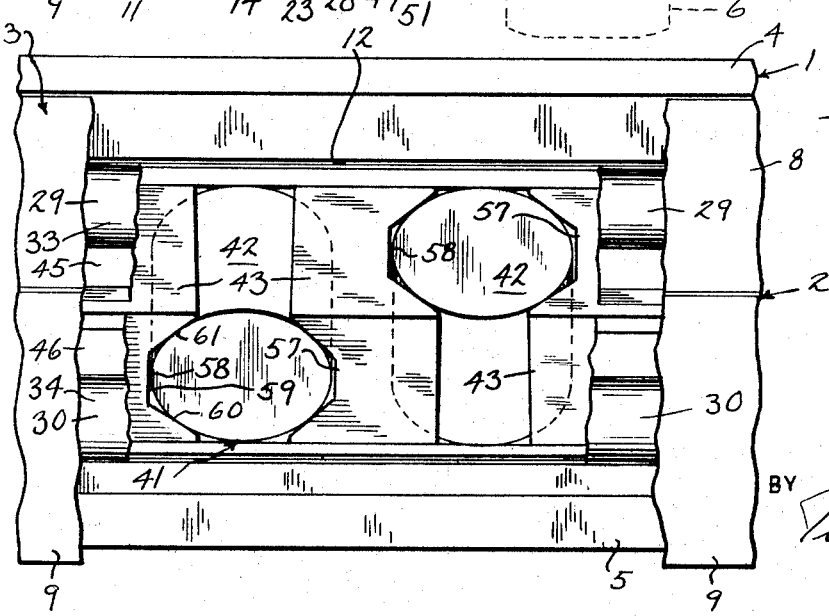
INVENTORS
TREVOR O. DAVIDSO
BRUNO L. LONNGREI
BY Thomas O. Kloehn
ATTORNEY June 30, 1970  B. L. LONNGREN ET AL  3,517,975
ROLLER BEARING CONSTRUCTION
Filed May 10, 1968  4 Sheets-Sheet 2
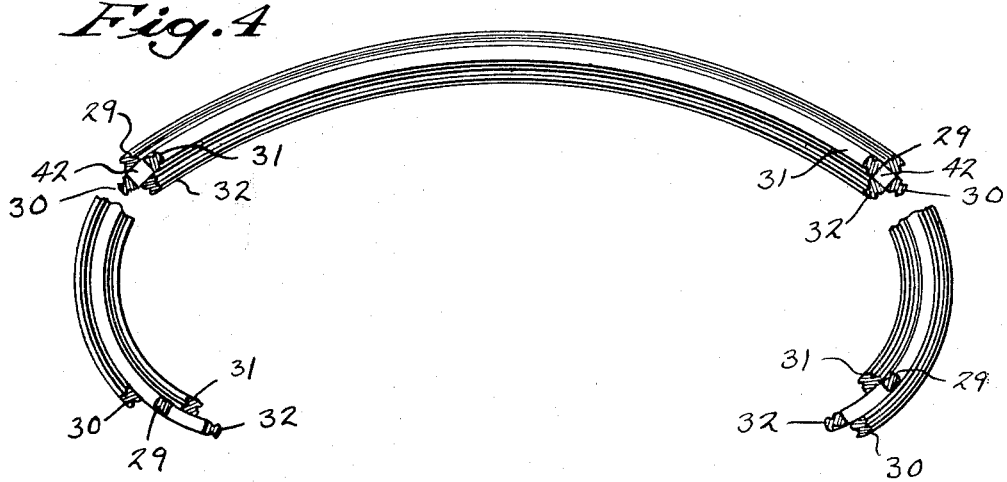
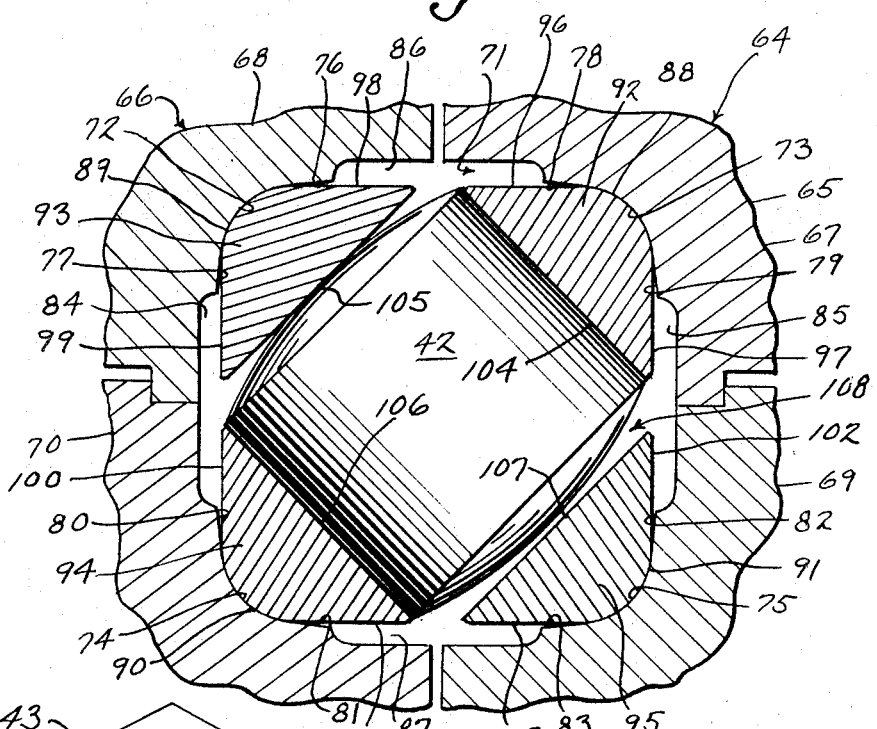
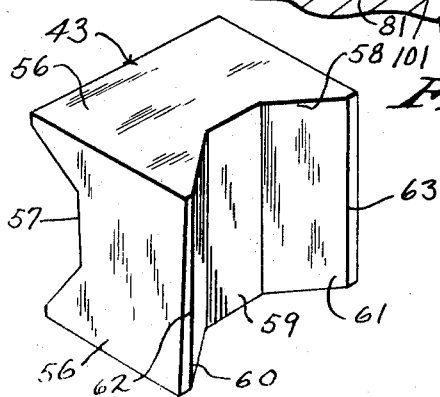
INVENTORS
TREVOR O. DAVIDSON
BRUNO L. LONNGREN
BY *Thomas O. Hocker*
ATTORNEY

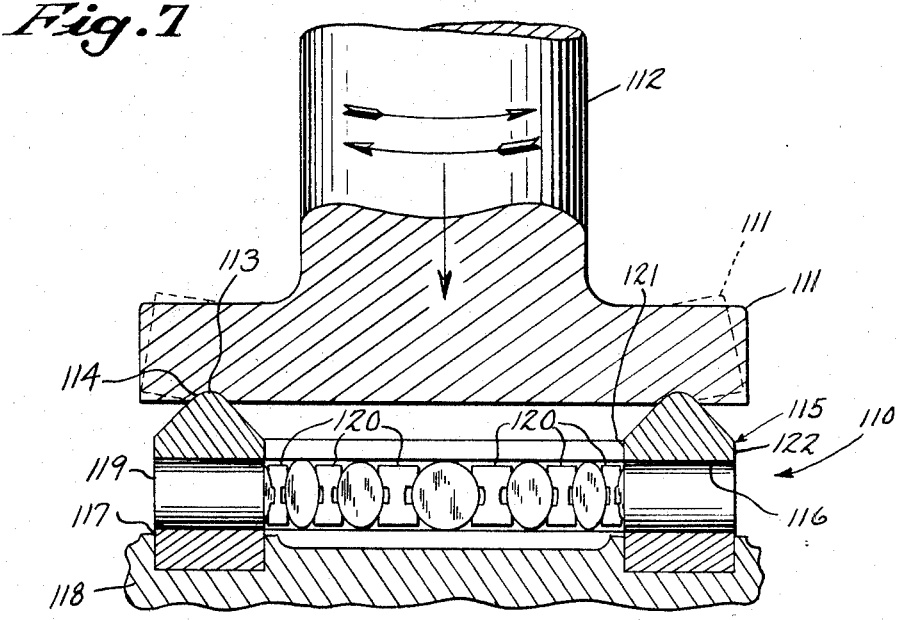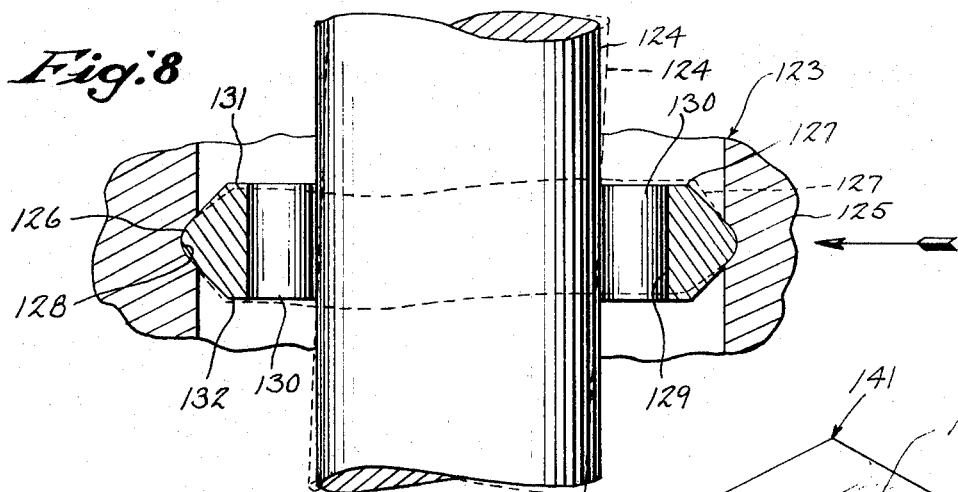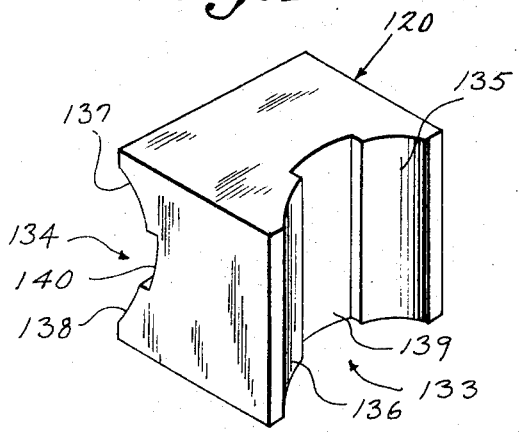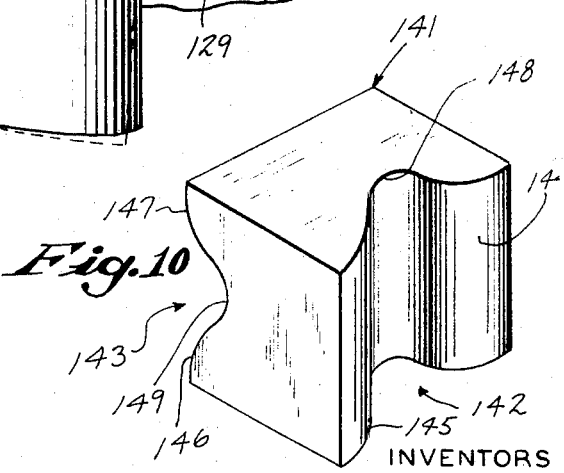
INVENTORS
TREVOR O. DAVIDSON
BRUNO L. LONNGREN
BY Thomas O. Kloehr
ATTORNEY

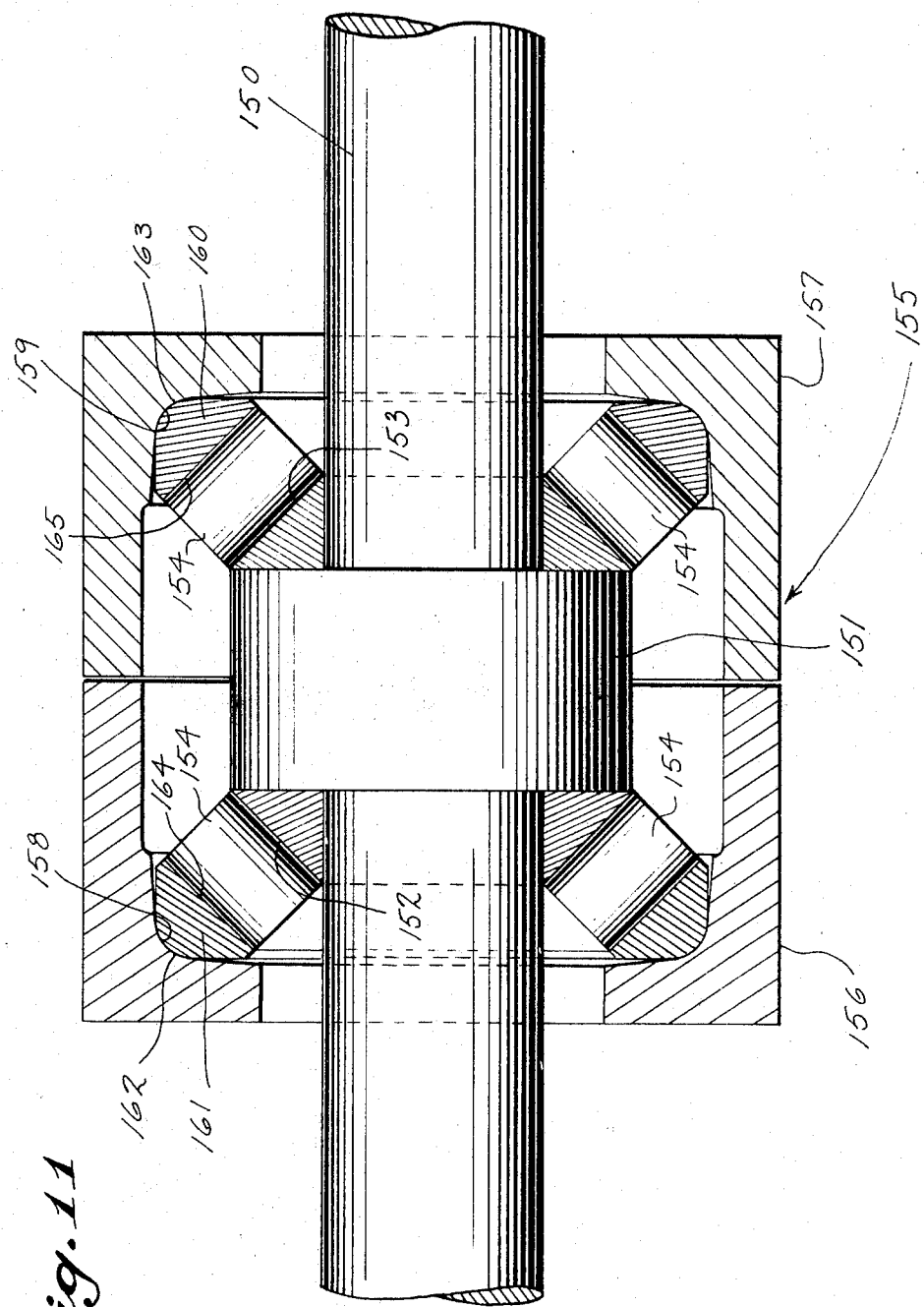

United States Patent Office 3,517,975
Patented June 30, 1970

3,517,975
ROLLER BEARING CONSTRUCTION
Bruno L. Lonngren, South Milwaukee, and Trevor O. Davidson, Milwaukee, Wis., assignors to Bucyrus-Erie Company, South Milwaukee, Wis., a corporation of Delaware
Filed May 10, 1968, Ser. No. 728,245
Int. Cl. F16c 19/10
U.S. Cl. 308—227                              14 Claims

ABSTRACT OF THE DISCLOSURE

The swing circle bearing embodiment has a hollow retainer ring assembly with rounded interior corners supporting roller rings, the interior surfaces of which define an enclosed race for crossed rollers separated by individual spacers. The exterior surfaces of the roller rings are fitted to the interior corners of the retainer ring assembly to adjust to irregularities in the system. The spacers have bearing surfaces that form two lines of contact with each roller. The other embodiments have aligned rollers separated by individual spacers between roller rings that seat adjustably in concavities in annular retainers.

Background of the invention

The sizes of the ball bearings required to sustain extreme loading between relatively moving parts of a machine in some application makes the cost of ball bearings prohibitively high. For example, the swing circle bearing of large excavators must sustain extremely heavy loading that may require the used balls six inches and more in diameter, which when purchased in the necessary quantity, add significantly to the cost of the machine. The cost of balls has been mitigated to some extent by mounting the balls in a cage and utilizing four corner wires for bearing races, so that only the corner wire need be made of the extraordinary hard, high quality and expensive bearing steel. The balls remain unavoidably expensive, notwithstanding.

It has also been suggested that for such applications less expensive roller bearings be employed, see, for example, U.S. Pat. No. 3,275,391; 3,258,301; 2,908,069; 2,040,741; 2,430,359; 2,607,641 and British Pat. No. 792,931, and one manufacturer constructs the roller bearing races out of four wires which have a triangular cross section so that the two sides of the triangular cross section will seat the wire firmly in a supporting ring and the hypotenuse of the triangle will serve as a race surface. That race construction minimizes the amount of high grade expensive bearing steel required in a roller bearing race just as the corresponding construction does for the ball bearing race, but it forms a rigid structure when assembled.

The problem lies in a major disadvantage of the roller bearings, in applications such as these. Unlike balls, rollers are vulnerable to edge loading which can be extremely destructive. To approach uniform distribution of the loading on the rollers, great precision in the manufacturing and assembly of the entire bearing structure is normaly required, and such precision, of course, enhances the cost of the bearing without reliable assurance that destructive edge loading will not occur. The present invention overcomes this problem with a novel race construction, and materially enhances the bearing construction with a novel spacer. The prior art has used either cages or spacers with rounded surfaces (U.S. Pat. No. 3,275,-391) to separate the rollers, but the need for a more effective means of distributing the loading while eliminating the need for a cage is satisfied by this invention.

Summary of the invention

The present invention relates to a roller bearing construction and more specifically it resides in an annular retainer assembly having a concave interior surface, a roller ring with a convex exterior surface to seat adjustably in the concave interior surface of said annular retainer assembly and an interior bearing surface, and a plurality of rollers rotatably bearing engaging said bearing surface.

The foregoing combination provides a unique race for a roller bearing that is self-adjusting under load to irregularities in the bearing construction or loading of the bearing. Not only is the roller ring allowed to adjust by twisting in its seat, but the edges of the roller ring may also deflect so that the ring is self-crowning. This minimizes, if it does not entirely eliminate the problem of edge-loading in the rollers. Moreover, this problem is solved without resorting to the expense of high precision construction required by the rigid assemblies of the prior art. In addition to the structure described above, the present invention includes a novel spacer to separate adjacent rollers. Each of the opposite surfaces of the novel spacer that is in contact with the rollers is formed so that there are two lines of contact between each roller and spacer. This construction of the spacer provides a broad, uniform distribution of the load and stabilizes the roller such that no cage is required and the possibility of edge loading is reduced to a minimum.

Brief description of the drawings

In the drawings:

FIG. 1 is a perspective view of a swing circle bearing of an excavator embodying the present invention.

FIG. 2 is a cross sectional view of the swing circle shown in FIG. 1 taken along the line 2—2 to illustrate a preferred embodiment of the present invention.

FIG. 3 is a segment of the swing circle shown in FIG. 1 with portions broken away to illustrate the structure of the bearing, including the roller rings, the roller and the spacers.

FIG. 4 is a view in perspective of the roller rings of the bearing construction of the present invention.

FIG. 5 is a view in perspective of the spacer embodying the present invention.

FIG. 6 is a view in section of an alternative embodiment of the present invention.

FIG. 7 illustrates in section an embodiment of the invention in a thrust bearing.

FIG. 8 illustrates in section an embodiment of the invention in a radial bearing.

FIG. 9 is a perspective view of an alternative embodiment of a spacer of the present invention.

FIG. 10 is a perspective of a third spacer configuraton embodying the present invention.

FIG. 11 is a side view in elevation of the present invention as embodied in a combined radial and thrust bearing.

Description of the preferred embodiment

The swing circle bearing embodying the present invention would rotatably support the revolving frame of an excavator (not shown) and it is made up of a retainer ring assembly 1 which has inner unit 2 and an outer unit 3 that rotate with respect to one another. The outer unit 3 would rest on the lower works of the excavator (not shown) which is in many cases some form of running gear, and the inner unit 2 would support the revolving frame. A ring gear (not shown) could be made integral with either the inner or outer units 2 and 3 to provide the swing drive, but it is preferable to assemble the gear (not shown) as a separate structure. The inner unit 2 is made up of an upper ring 4 and a lower ring 5 that are bolted together by bolts 6 mounted in the assembly hole 7. Similarly, the outer unit 3 is made up an upper ring 8 and a lower ring 9 that are bolted together by bolts 10 through assembly holes 11.

The retainer ring assembly 1 has a hollow interior 12 with four rounded corners 13, 14, 15 and 16, respectively. Side walls 17, 18, 19, 20, 21, 22, 23 and 24 extend tangentially from the respective corners 13–16 a short distance to recessed grooves 25, 26, 27 and 28 between the corners 13–16, respectively. The recessed grooves 25–28 serve three purposes: first they reduce the amount of close tolerance machining required; second, they allow easy access for tools, and facilitate manufacture by allowing for run-out of the forming tool; and third, they leave the lateral bearing surfaces 37–40 of roller rings 29–32 unsupported.

The four roller rings 29, 30, 31 and 32 are adjustably seated, respectively, in the four corners 13–16 of the hollow interior 12 of the retainer ring assembly 1, and each of the four corners 13–16 is a concavity in cross section appearing as a 90° circle segment. Each one of the roller rings 29–32 also has relatively flat interior bearing surfaces 37, 38, 39 and 40, so that when the roller rings 29–32 are assembled in the hollow interior 12 of the retainer ring assembly 1 they will define a quadrilateral raceway 41 for a plurality of alternately crossed rollers 42 and spacers 43 that separate the rollers 42. Lateral exterior walls 44, 45, 46, 47, 48, 49, 50 and 51 of the roller rings 29–32, respectively, are also indented at the ends of the respective arcuate external surfaces 33–36 to clear the adjacent side walls 17–24 of the hollow interior 12 of the retainer assembly 1 and thus reduce areas of contact to allow limited twisting of the roller rings 29–32 permitting them to adjust under load.

The roller rings 29–32 have triangular cross sections with the result that the thickness of the roller bearing diminishes or tapers away from the center of bearing surfaces 37–40 to the lateral edges of the bearing surfaces 37–40. The tapered relatively thin lateral edges of the bearing surfaces 37–40 as is described above are not supported by the respective retainer rings 4, 5, 8 and 9, but instead project freely in the interior space of the retainer assembly 1. Thus when the bearing is so loaded that a large force is exerted on one lateral edge or the other of the bearing surfaces 37–40, those lateral edges of the bearing surfaces 37–40 can deflect and when thus deflected, the bearing surfaces 37–40 would appear in cross section to be crowned. Thus the bearing surfaces 37–40 may be said to be self crowning. This self-crowning alleviates edge loading on the rollers 42, and that is the purpose behind the common practice of machining a crown on conventional prior art bearing surfaces.

The side walls 17 and 18 of the hollow interior 12 of the outer unit 3 of the retainer ring extend beyond the adjacent lateral walls 45 and 46 of the respective upper outside roller ring 29 and lower outside roller ring 30, before the recessed groove 25 in the outer assembly 3 defines shoulders 52 and 53. Similarly in the inner unit 2 the side walls 19 and 20 that are tangential to the upper and lower corners 15 and 16, respectively, of the hollow interior 12 extend beyond the arcuate outer surfaces 35 and 36 of the inner roller rings 31 and 32, respectively, before the inner recessed groove 27 defines retaining shoulders 54 and 55. The retaining shoulders 52 and 53 in the hollow interior 12 of the outer unit 3, and the retaining shoulders 54 and 55 in the hollow interior 12 of the inner unit 2 serve to hold the respective roller rings 29–32 in position during assembly. While this feature need not directly affect the operation of the roller bearing construction according to the present invention, if each of the rings 4, 5 and 8 and 9 of the inner and outer units 2 and 3 of the retainer ring assembly 1 and each of the roller rings 29–32 is formed as a single, unitary annular member, the retainer shoulders 52, 53 and 54 and 55 can make the difference between facile, efficient assembly and awkward, costly, difficult assembly.

The spacer 43 is a square prism made of some appropriate antifriction material such as brass, nylon or the like, and its external dimensions are slightly shorter than the spaces between opposite bearing surfaces 37, 38, 39 and 40 of the roller rings 29–32 to provide clearance. Four of its sides 56 are simply flat surfaces. There remains, therefore, two opposite sides 57 and 58 that are spacer bearing surfaces. Each of the spacer bearing surfaces 57 and 58 is concave, and the concavity of the opposite bearing surfaces 57 and 58 are crossing, or at right angles to one another, since the rollers 42 are to be mounted to alternately cross one another. Each of the concave bearing surfaces 57 and 58 has three trapezoidal facets 59, 60 and 61, a bottom facet 59, and two side facets 60 and 61 that diverge from the bottom facet 59 to opposite edges 62 and 63 of the concavities of the bearing surface sides 57 and 58. The angle of the side facets 60 and 61 and the depth of the bottom facet 59 are established relative to the rollers 42 such that the roller 42 makes a line contact with each of the side facets 60 and 61, but does not touch the bottom facet 59, which may be considered simply a relieved surface. This relationship distributes the bearing force evenly over the rollers 42 and the spacer 43 to minimize the possibility of any binding between the rollers 42 and the spacer 43, and any edge loading on the rollers 42.

Since the spacer 43 and rollers 42 are like segments of wheel spokes in that they converge toward the center of the retainer ring assembly 1, either the rollers 42 or the spacer 43 or both must be tapered. It is preferable from a production standpoint to taper the spacer 43 and that is why the facets 59–61 are trapezoidal instead of rectangular. However, it is difficult to illustrate so slight a taper in the drawings, so the facets 59–61 appear to be substantially rectangular.

An alternative embodiment of the invention is illustrated in FIG. 6. A retainer ring assembly 64 is made up of an inner unit 65 and an outer unit 66 each of which is horizontally separated into upper members 67 and 68 and lower members 69 and 70. The retainer ring assembly 64, as in the previous embodiment, has a hollow interior 71 which has four, concave, rounded corners 72, 73, 74 and 75. Lateral walls 76, 77, 78, 79, 80, 81, 82 and 83 extend tangentially from the respective rounded corners 73, 74 and 75 at an angle diverging from the center of the hollow interior 71 of the retainer ring assembly 64 and each is recessed to form, respectively, side grooves 84, 85, a top groove 86 and a bottom groove 87. If the lateral side walls 76–83, respectively, were extended to intersection, the hollow interior 71 of the retainer ring assembly 64 would have an octagonal cross sectional shape with four of its corners 72–75 rounded.

Seated in the rounded corners 72–75 of the hollow interior 71 of the retainer ring assembly 64 are arcuate outer surfaces 88, 89, 90 and 91, respectively, of four roller rings 92, 93, 94 and 95, respectively. Each of the roller rings 92–95 has a pair of straight exterior side walls 96 and 97, 98 and 99, 100 and 101, and 102 and 103, respectively, that are normal to each other. Interior bearing surfaces 104, 105, 106 and 107 of the roller rings 92–95, respectively, define a quadrilateral raceway 108 when the roller rings 92–95 are assembled in the retainer ring assembly 64. Rollers 42 and spacer 43 are assembled in the raceway 108 as in the previously described embodiment.

The drawing of the second embodiment shows that the lateral walls 76–83 of the hollow interior 71 of the retainer ring assembly 64 diverge from the side walls 96–103 of the roller rings 92–95 so as to create a space between the roller rings 92–95 and the retainer ring assembly 64 beyond the area of contact of the curved outer surfaces 88–91 of the roller rings 92–95 in the rounded corners 72–75 of the hollow interior 71 of the retainer ring assembly 64. This permits the continual adjustment of the roller rings 92–95 when under load irregularities so that full face contacts are maintained between the rollers 42 and the bearing surfaces 104–107 of the raceway 108. Thus, the spalling or crushing of the rollers 42 that results from edge loading is avoided. However, in this structure there is nothing to hold the roller rings 92–95 in the members 67–70 of the retainer ring assembly 64 during assembly, so it might be convenient to screwmount the roller rings 92–95 in the retainer members 67–70 until the assembly is completed. Then the holding screws or other devices utilized to stablize the members should be removed to permit the desired adjusting movement of the roller rings 92–95 in the retainer ring assembly 64 during operation.

The unique aspects of the first two embodiments of roller bearings according to the present invention have been set forth in the description of the pertinent structure. The spacer 43 maintains proper alignment of the rollers 42 and the roller rings 29–32 or 92–95 are mounted in the retainer ring assemblies 1 or 64 so that the roller rings 29–32 or 92–95 can twist and move when under load to maintain line contact with the rollers 42 and thus prevent edge loading. Also, the edges of the bearing surfaces 37–40 and 104–107 can deflect, making the roller rings 29–32 and 92–95 self-crowning and this self-crowning feature also cooperates to prevent edge loading on the rollers 42.

FIG. 7 illustrates the present invention as embodied in a simple thrust bearing 110. In this embodiment, the retainer assembly is formed by a flange 111 that is integral with a rotating shaft 112 that has an axial thrust force exerted upon it. The thrust force is indicated by the axial arrow appearing in FIG. 7 and the fact that the shaft may be rotated in either direction is indicated by the pair of oppositely oriented arcuate arrows on the shaft 112. The flange 111 has an arcuate annular concavity 113 opening downward, and adjustably seated in the concavity 113 is a convex external surface 114 of the roller ring 115, which has a bearing surface 116 formed on its underside. A fixed annular roller ring 117 is rigidly mounted in a second retainer 118 opposite the adjustable roller ring 115. Between the roller rings 115 and 117 are a plurality of straight rollers 119 separated by spacers 120 of the configuration illustrated in FIG. 9. It should be noted that in this embodiment, the rollers 119 are aligned radially as distinguished from the first two embodiments where the rollers 42 are alternately crossed.

As is illustrated in broken line, under heavy thrust force the edges of the flange 111 may be flexed upwardly so that if the roller ring 115 were rigidly mounted the thrust force would be concentrated on the edges of the rollers 119. However, due to the adjustable mounting of the roller ring 115 according to the present invention, the roller ring 115 can twist in its seating in the concavity 113 of the flange 111 so as to distribute the thrust force evenly over the surface of the rollers 119. Also, since the internal and external edges 121 and 122 of the roller ring 115 are unobstructed and relatively thin, they can flex under the thrust force to aid in the distribution of that force over the surface of the rollers 119 rather than concentrating the force on the edges of the rollers 119.

FIG. 8 shows a radial bearing 123 through which a shaft 124 that is subject to radial forces rotates. The effect of the radial forces to skew the shaft 124 is illustrated by the showing of the shaft 124 in dotted line. A fixed retainer 125 is mounted about the shaft 124 and its circular inside surface has an arcuate concave groove 126 formed in it. An annular roller ring 127 has a convex external surface 128 that seats adjustably in the concave groove 126 of the retainer 125, and its interior surface forms a bearing surface 129 for straight rollers 130. As in the previous embodiment, all of the rollers 130 are aligned and they are separated by spacers (not shown). When radial forces bearing against the shaft 124 force the shaft into its dotted line position, the roller ring 127 is able to twist in its mounting in the concave groove 126 to accommodate the change in position of the shaft 124 so as to maintain a substantially uniform pressure along the entire surface of the rollers 130 and thus avoid edge loading. Also, as in the previous embodiments, the lateral edges 131 and 132 of the roller ring 127 are free to flex under the force exerted by radial forces on the shaft 124, making the roller ring 127 self-crowning to permit a further adjustment of the distribution of force along the surface of the rollers 130.

The embodiment of the spacer 120 shown in FIG. 7 is illustrated in perspective in FIG. 9, where it can be seen that the spacer 120 shares the same general solid prismatic shape as in the previous embodiments, but it has a pair of unique bearing surfaces 133 and 134. It should also be noted that the embodiment of the spacer 120 shown in FIG. 9 is for cross roller bearings whereas the embodiment of the spacer 120 shown in FIG. 7 is for aligned rollers 119, but this has no other effect on the structure of the spacer 120 than the relative orientation of the axes of the bearing surfaces 133 and 134. Each of the bearing surfaces 133 and 134 has two arcuate facets 135 and 136, 137 and 138, respectively. The shape of the arcuate facets 135–138 may be defined as an arc having a greater radius than the roller 119 to be used with the spacer 120. Thus each facet 135–138 has one line of contact with the roller 119 and the roller 119 has two lines of contact with each spacer 120. The bottoms of the bearing surfaces 133 and 134 have reliefs 139 and 140, respectively, cut out of separating respective arcuate facets 135–136, 137 and 138. The primary function of the reliefs 139 and 140 are to ensure that the rollers 119 do not contact the bottom of the bearing surfaces 133 and 134, but instead maintain just two line contacts with each bearing surface 133 and 134, one on each of the arcuate facets 135–138, respectively.

FIG. 10 illustrates still another embodiment of the spacer 141. Once again the spacer has the general shape of prismatic solid and in the embodiment shown it has bearing surfaces 142 and 143 on opposite sides adapted to accommodate crossed roller bearings, but if the bearing surfaces 142 and 143 were oriented in parallel alignment then the spacer 141 could be employed in an aligned roller bearing. In this embodiment of the spacer 141, each of the bearing surfaces 142 and 143 has a pair of convex facets 144, 145 and 146, 147, respectively, separated by a concave relief 148 and 149, respectively. The convex facets 144, 145, 146 and 147, respectively, are spaced so as to form two line contacts with an adjacent straight roller, and the concave reliefs 148 and 149, respectively, are formed sufficiently deep so that the bottoms of the bearing surfaces 142 and 143 cannot form a third line of contact with the adjacent roller.

The combination of the disclosed spacers embodying the present invention with the adjustable roller ring 115 and 129 of the last two embodiments described serves to distribute the loading on a bearing across the entire faces of the rollers 120 and 130. As has been mentioned, this is accomplished by allowing the roller rings 115 and 129 to twist and adjust in their seatings and also by freeing the lateral edges 121 and 122, 131 and 132 of the roller rings 115 and 129, respectively, so as to permit these edges 121 and 122, 131 and 132 to deflect and thus provide self-crowning roller rings 115 and 129. It has been customary in the past to form bearing surfaces in a roller bearing with a slight crown so as to minimize edge loading but by making edges 121, 122, 131 and 132 of the roller rings 115 and 129 flexible, the roller rings 115 and 129 become self-crowning under load.

A fourth embodiment of the invention is a combination radial and thrust bearing shown in FIG. 11, where the bearing is mounted about a shaft 150. The shaft 150 has a collar 151 formed about it as a retainer for beveled bearing surfaces 152 and 153 mounted about the shaft 150 on opposite ends of the collar 151. The collar 151 transmits the thrust forces to the beveled bearing surfaces 152 and 153 and the shaft 150 transmits the radial forces to the beveled bearing surfaces 152 and 153. Hence, if the collar 151 is a separate member, it must be so mounted to withstand the anticipated thrust forces. The beveled bearing surfaces 152 and 153, respectively, are formed on rings of bearing material that are mounted about a shaft 150 to abut the ends of the collar 151. A retainer assembly 155 is made up of a pair of annular retainer rings 156 and 157 that are adapted to be mounted together to surround and enclose the portion of the shaft 150 that mounts the collar 151 and beveled bearing surfaces 152 and 153. Arcuate interior concavities 158 and 159 are formed, respectively, at the exterior ends of the retainer rings 156 and 157. A roller ring 160 has a convex exterior 162 which adjustably seats in the interior concavity 158 of the retainer ring 156, and a roller ring 161 has a convex exterior surface 163 to seat adjustably in the interior concavity 159 of the retainer ring 157. The roller rings 160 and 161 have slanting bearing surfaces 164 and 165, respectively, which form an angle with respect to the axis of the roller rings 160 and 161 that complements the angle of the beveled bearing surfaces 152 and 153, so that a plurality of rollers 154 can ride between the bearing surfaces 164 and 165 on the roller rings 160 and 161 and the opposing beveled bearing surfaces 152 and 153 mounted on the shaft 150 and collar 151. Since the rollers 154 shown here are straight rollers, the bearing surfaces 164 and 165 on the roller rings 160 and 161 are parallel with the beveled bearing surfaces 152 and 153 that oppose them. The term "complement" instead of "parallel" is used to emphasize the possibility of using either tapered or straight rollers, for if tapered rollers were used the opposite bearing surfaces defining the roller races would not be parallel.

It is implicit in the foregoing description that the invention is not confined to the specific embodiments shown. Many variations in addition to those disclosed above will be evident to those skilled in the art. Hence, the invention is set forth in the claims that follow.

We claim:
1. A roller bearing comprising the combination of an annular retainer ring having an arcuate concave interior surface;
an annular roller ring having a substantially triangular cross-sectional configuration defined by an interior bearing surface, a pair of lateral side walls generally converging from opposite lateral edges of said interior bearing surface, and an arcuate exterior surface joining said generally converging lateral side walls opposite said interior bearing surface, said arcuate exterior surface being substantially less than semicircular in cross-sectional length and shaped to adjustably seat in said concave interior surface of said retainer ring, at least a substantial portion of said lateral side walls adjacent to said interior bearing surface being free to deflect under load to crown said interior bearing surface;
a second bearing surface spaced from and parallel to said interior bearing surface of said annular roller ring;
said bearing surfaces defining between them an annular roller bearing race.
2. A roller bearing as set forth in claim 1 wherein a plurality of rollers are located in said roller bearing race; and
said rollers are separated one from another by spacers having bearing surfaces that form two lines of contact with adjacent rollers.
3. A roller bearing as set forth in claim 2 wherein said spacers have crossed bearing surfaces; and
said rollers are alternately crossed.
4. A roller bearing as set forth in claim 2 wherein said spacers have parallel bearing surfaces; and
said rollers are parallel.
5. A roller bearing as set forth in claim 2 wherein each of said bearing surfaces has two lateral facets separated by a relieved surface.
6. A roller bearing as set forth in claim 5 wherein said facets are flat surfaces.
7. A roller bearing as set forth in claim 5 wherein said facets are convex.
8. A roller bearing as set forth in claim 5 wherein said facets are concave and have a radius larger than a radius of said roller.
9. A roller bearing as set forth in claim 1 wherein lateral edges of said bearing surface of said roller ring are unsupported by said retainer ring assembly to be free to deflect under loading.
10. A roller bearing as set forth in claim 9 wherein a cross sectional thickness of said roller ring diminishes from the center of said bearing surface to the lateral edges of said bearing surface.
11. A roller bearing as set forth in claim 1 wherein four of said retainer rings are assembled together in two connected pairs of rigidly connected rings, said pairs being rotatable with respect to one another;
said four assembled retainer rings define a hollow interior having a corner in each ring, said corner being rounded to form said arcuate concave interior surface;
one of said annular roller rings having an arcuate exterior surface is adjustably seated in said arcuate concave interior surface of each retainer ring to form relatively rotatable first and said second bearing surfaces; and
said inteior bearing surfaces of said roller rings define a quadrilateral annular roller bearing race to receive alternately crossed rollers.
12. A roller bearing as set forth in claim 1 wherein said annular retainer ring is formed on a rotatable shaft; and
said bearing surface of said roller ring is normal to an axis of said shaft.
13. A roller bearing as set forth in claim 1 wherein said annular retainer ring is mounted about a rotatable shaft;
said shaft forms said second bearing surface; and
said bearing surface of said roller ring is parallel to an axis of said shaft.
14. A roller bearing as set forth in claim 1 wherein said annular retainer ring has two annular arcuate concave interior surfaces, said surfaces being axially aligned and spaced apart;
one of said annular roller rings is adjustably seated in each of said annular arcuate concave interior surfaces and said interior bearing surface of each roller ring is slanted with respect to an axis of said roller ring;
a shaft axially aligned with said roller rings is mounted coaxially inside of said roller rings;
one of said second bearing surfaces is mounted on said shaft opposite to each of said bearing surfaces on each of said roller rings;
a plurality of aligned rollers are located in each annular roller bearing race; and
said annular retainer ring and said shaft are relatively rotatable.

References Cited

UNITED STATES PATENTS

| | | | |
|---|---|---|---|
| 1,778,391 | 10/1930 | Kendall | 308—194 |
| 2,805,108 | 9/1957 | Palmgren | 308—217 |
| 3,275,391 | 9/1966 | Blais | 308—174 |
| 3,361,500 | 1/1968 | Pohler | 308—227 |
| 3,365,255 | 1/1968 | Altson | 308—217 |

FOREIGN PATENTS 499,180   1/1939   Great Britain.

MARTIN P. SCHWADRON, Primary Examiner